Oct. 16, 1951  S. RUBEN  2,571,616
ELECTRIC CURRENT PRODUCING CELL
Filed April 6, 1951
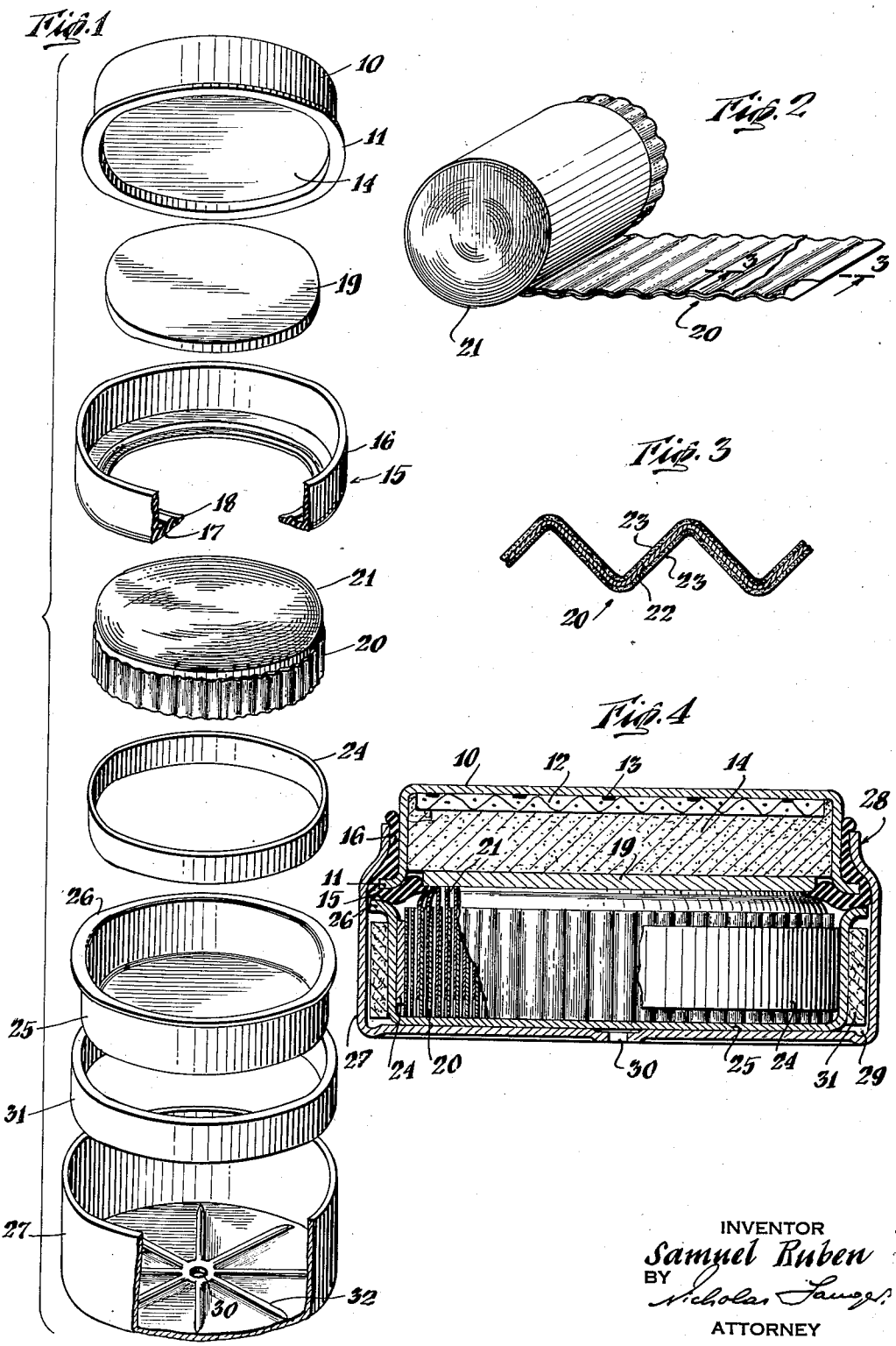
INVENTOR
Samuel Ruben
BY
Nicholas Langer
ATTORNEY Patented Oct. 16, 1951

2,571,616

UNITED STATES PATENT OFFICE 2,571,616

ELECTRIC CURRENT PRODUCING CELL

Samuel Ruben, New Rochelle, N. Y.

Application April 6, 1951, Serial No. 219,563

17 Claims. (Cl. 136—7)

This invention relates to electric current producing cells, such as primary and secondary cells, and, more particularly to cells of novel and improved character.

It is an object of the present invention to improve electric current producing cells.

It is another object of the present invention to provide electric current producing cells characterized by a low internal resistance which is retained throughout the useful life of the cells.

It is a further object of the invention to provide a secondary cell having a high capacity-volume ratio which is capable of an extremely large number of charging and discharging cycles without appreciable reduction in its capacity.

It is also within the contemplation of the invention to provide a secondary or rechargeable cell comprising improved means for establishing and maintaining permanent and low resistance contact between the positive and negative electrode materials and their respective terminals which generally constitute the container or casing of the cell.

The invention also contemplates a novel and improved rechargeable cell of the sealed alkaline type characterized by a depolarizer comprising a major portion of mercuric oxide and a minor portion of silver having high capacity, long life and which may be readily manufactured on a quantity production scale at a relatively low cost.

Other and further objects and advantages of the present invention will become apparent from the following description, taken in conjunction with the drawing, in which Fig. 1 is an exploded perspective view of a preferred form of cell embodying the principles of the present invention;

Fig. 2 is a perspective view showing a step in the manufacture of one of the electrodes of the cell;

Fig. 3 is a section taken on line 3—3 of Fig. 2; and

Fig. 4 is a vertical section through a completed cell.

The present application is a continuation-in-part of my co-pending application Serial No. 35,831, filed June 29, 1948, now U. S. Patent 2,554,504, granted May 29, 1951.

In my U. S. Patent No. 2,422,046 I have disclosed and claimed a cell structure comprising a first metal container, a first electrode compact compressed in the bottom thereof, a second electrode-spacer structure in the form of a roll of metal foil interleaved with absorbent sheet spacer material, the edge of said foil projecting at one end of said roll and spacer material projecting at the other end of said roll, and a metal top or second container insulated from said first container. The length of the electrode-spacer roll is so determined that the edge of the foil is pressed against the inner surface of the top thereby providing electrical connection therebetween while the edge of the absorbent sheet spacer material is pressed against the surface of the first electrode compact or against an ionically permeable barrier layer on the surface of said compact. A suitable electrolyte is absorbed in the absorbent spacer. Of course, great variations are possible in the selection of the active cell materials, of the material of the containers and as to the specific electrolyte according to the particular electrochemical cell system that is utilized.

The cell structure just described and generally known in the art as the "wound anode" construction provides excellent results and is at present utilized on a very substantial scale in the quantity production of dry cells. However, certain practical difficulties were experienced in maintaining a low internal resistance of the cells, such difficulties being particularly accentuated when employing the described cell structure in heavy duty primary cells or in secondary or rechargeable cells. Experimental investigation indicated that in order to maintain low internal resistance of the cell, it was of critical importance to establish and to maintain a permanent and low resistance electrical contact between the positive and negative electrodes and their respective terminals, generally in the form of metal containers and shells. As to the positive electrode, provided in the form of a depolarizer compressed in the positive terminal shell, the initially satisfactory contact between the compact and shell generally deteriorated during progressive consumption of the depolarizer. Particularly when the cell was of the rechargeable type, after a number of cycles of charging and discharging the compact would crack due to repeated expansion and contraction of the compact during the cycle, thus causing increase of the contact resistance between the compact and its shell. As to the negative electrode, its electrical connection to its terminal was predicated upon the edge of the electrode foil being pressed against the inner surface of the cell top or second electrode shell. While such connection may be considerably improved by an amalgam bond formed between the foil and terminal, it would likewise deteriorate and increase the internal resistance of the cell, such being particularly the case in secondary or rechargeable cells where the repeated deposition and dissolution of the negative electrode metal experienced during charging and discharging tended to cause deterioration of the initially intimate electrical contact.

All of these difficulties may be substantially eliminated by the cell structures of the present invention. Although the invention will be described with particular reference to the secondary cell system disclosed and claimed in my above-mentioned co-pending application Ser. No. 35,831, it is to be understood that the principles of the present invention are applicable with equal or similar results to a great variety of different cell systems.

Referring now more particularly to the drawing, particularly to Fig. 4, thereof, reference numeral 10 denotes a positive electrode shell formed of steel and preferably nickel-plated. Shell 10 is provided with an outwardly extending flange 11. A nickel-plated steel screen disc 12 is permanently conductively secured to the bottom surface of shell 10, for example by means of one or several spot welds 13.

The positive electrode or depolarizer 14 is an intimate mixture of a major portion of mercuric oxide with a minor portion, 15-30% by weight, of silver or silver oxide powder. This mixture is preferably produced by double precipitation from a common solution in order to obtain an extremely fine and uniform dispersion, as it will be more fully explained hereinafter. The depolarizer mixture is pressed into pellets and the pellets and the pellets are broken up into granules. A pellet is pressed from the granules, having a diameter somewhat smaller than that of shell 10 and the pellet is inserted into the shell above screen 12 and is consolidated therein at a pressure considerably higher than the pelleting pressure. This will cause the metal screen to be completely embedded into and to be intimately bonded with the depolarizer compact 14. Since the screen is spot welded to the bottom wall of the shell, the permanent low resistance electrical contact of the depolarizer with the shell is assured throughout the useful life of the cell even though the depolarizer compact may in time develop deep fissures or cracks.

An insulating and sealing grommet 15 of a suitable elastomer, such as polyethylene, is stretched around flange 11 of shell 10. At is will be best observed in Fig. 1, showing the structural cell elements prior to their assembly, the grommet comprises an axially extending portion 16 and a radially extending portion 17, the latter including an internal flange or ledge 18 for holding a barrier disc 19 against the surface of compact 14 and to fix the position of the barrier disc against lateral displacement.

The function of the barrier is to prevent the migration of deleterious particles from one electrode to the other. For the purposes of the present invention, it is preferred to provide the barrier in the form of a microporous, ionically permeable ceramic disc, such as one formed of sintered magnesium oxide with a small addition of a suitable silicate binder.

The negative electrode-spacer structure (Fig. 2) is made by winding up a strip of corrugated negative electrode foil 20 with a strip of absorbent sheet spacer material 21, such as Dexter paper, in offset relation so that an edge of the foil extends at one end of the roll and an edge of the spacer material protrudes at the other end of the resulting roll. The length of the electrode foil is so determined that the foil constitutes the entire outer turn of the roll. The negative electrode foil is in the form of a zinc-copper-zinc trimetal (Fig. 3) which may be provided by electroplating layers of zinc 23 on both faces of copper foil 22 or by brazing and rolling together two strips of zinc with an interposed strip of copper. A contact ring or band 24 is placed around the electrode roll in contact with the outer turn of the electrode foil. The ring is formed of a metal inert to the electrolyte and having, when amalgamated, low contact potential with respect to zinc. Copper or copper-base alloys are satisfactory for the purposes of the invention, such as particularly commercial bronze, which is an alloy of 90% copper and 10% zinc.

The negative electrode-spacer structure is amalgamated and is impregnated with the alkaline electrolyte, such as potassium hydroxide. Preferably, a suitable quantity of zinc oxide is added to the electrolyte so that the electrolyte will initially contain a substantial quantity of potassium zincate. An electrolyte composed of 100 grams 80% KOH, 16 grams ZnO and 100 grams of water is satisfactory. The amalgamated electrole roll, with the contact ring around it, is then pressed into the negative electrode shell or can 25 having an outwardly extending flange 26 formed of commercial bronze, with the edge of the electrode foil pressed against the bottom of the shell and the contact ring in intimate contacting relation with the inner circumferential surface of the shell. A slight taper to the walls of the bronze shell is helpful in establishing good contact.

The negative electrode subassembly, comprising shell 25 and electrode-spacer structure 20, 21 with contact ring 24 therearound, is now combined with the positive electrode subassembly comprising shell 10 with depolarizer compact 14 pressed therein, grommet 15 around its flange, and barrier disc 19 held against the surface of the compact by inner ledge or flange 18 of the grommet. This is accomplished by facing the positive electrode subassembly into the negative electrode subassembly with the radially extending portion 17 of grommet 15 interposed between flanges 11 and 26 of the shells. In this position, the upper edge of the absorbent sheet material 21 is pressed against barrier disc 19 and the outermost turns thereof will slightly deflect radially extending portion 17 of the grommet as this is shown in Fig. 4.

The superimposed positive and negative electrode subassemblies are now introduced into an outer container or shell 27 of steel which jackets shell 25 and has its mouth portions around the axial portion 16 of grommet 15. The said mouth portions of container 27 are now radially crimped at 28 whereby the entire cell structure is sealed by the axial pressure exerted upon portion 17 of grommet 15 by flanges 11 and 26 of the shells.

The cell of the invention is normally free of gas generation both on charging and discharging and also under no load conditions. However, generation of gas may occur when the cell is being greatly overcharged. In that case the increase of internal pressure will cause limited displacement of shells 10 and 25 in the axial direction away from each other. The gas under pressure will then flow around the edge of flange 26 of shell 25 into interspace 29 between shell 25 and outer container 27 from which it is harmlessly dissipated into the external atmosphere through opening 30 in the bottom center of the outer container. A ring 31 of absorbent material, such as paper, is provided in the said interspace 29 for absorbing any electrolyte that may be carried along by the vented gas. As soon as the excess internal pressure has been dissipated, the two shells 10 and 25 are automatically returned into their normal sealed relation by the resiliency of grommet 15.

As it appears from Fig. 1, upwardly extending ribs 32 having a star-shaped configuration are provided in the bottom surface of outer container 27. These ribs provide a small interspace between the bottom surfaces of shell 25 and of the outer container, respectively, through which the vented gas may be readily passed to outlet opening 30. The said ribs also tend to improve the electrical contact between shell 25 and the outer container 27, which constitutes one of the terminals of the cell. The other terminal of the cell is constituted by steel shell 10, which is nickel-plated. This has been found to prevent the creepage of electrolyte from the interior of the cell.

It will be noted that the cell structure of the present invention provides the following principal advantages which are of great importance in heavy duty primary cells and in rechargeable or secondary cells:

1. A low resistance electric contact is provided between the positive electrode compact 14 and its shell 10, as a result of the presence of screen disc 12 which is spot welded or is permanently secured to the bottom of shell 10 in some other appropriate manner. Such low resistance contact is maintained throughout the life of the cell even though fissures or cracks may develop in the compact.

2. A low resistance electric contact is provided between the negative electrode foil 20 and shell 25 by the interposed force-fitted contact ring 24. This very effective contact is further supplemented by the pressure contact between the protruding edge of the foil and the bottom of shell 25.

3. The grommet construction positively fixes the position of barrier disc 19 against lateral displacement. Furthermore, the internally extending portions 17 and 18 of the grommet mask the outermost turn or turns of the electrode foil so that there is little or no electrolytic action thereon during operation of the cell. This will assure that the intimate contact between the outer turn of the foil, the contact ring 24 and the shell 25 will not be adversely affected.

In order that those skilled in the art may have a better understanding of the invention, the following illustrative example may be given with specific reference to a practical and commercial cell embodying the principles of the present invention:

EXAMPLE

Preparation of depolarizer

The depolarizer used corresponds to 20% $Ag_2O$ plus 80% $HgO$ and is produced by double precipitation from a common solution in order to obtain a very intimate mixture of the two oxides.

130 parts by weight of $Hg(NO_3)_2 2H_2O$ and 30 parts by weight of $AgNO_3$ are dissolved in 500 parts by weight of water which is slightly acidified with $HNO_3$. The solution is heated to 60° C. and the oxides are precipitated by the addition of 450 parts by weight of 30% KOH solution. The precipitate is washed thoroughly and dried. Small compacts or pellets are pressed from the dry precipitate and are broken up again to granulate the depolarizer.

Cathode subassembly

The cathode shell, having a diameter of 1.020" and a height of 0.235", is formed of steel and is nickel-plated on its inner surface. It has a nickel plated steel screen (20 mesh) disc, having a diameter of 0.960", spot-welded in the bottom thereof.

14 grams of the depolarizer granules are pressed into a pellet having a diameter of 0.960 at a pressure of five tons. This pellet is introduced into the cathode shell and is consolidated therein at a pressure of about 11½ tons to a height of 0.190", including the bottom wall thickness of the shell. The consolidated depolarizer compact completely embeds the wire screen.

The ceramic barrier disc and grommet are assembled with the cathode shell, with the grommet being stretched around the flange of the shell and holding the barrier disc against the surface of the cathode compact.

Preparation of barrier disc

Electrically fused magnesium oxide, containing a small amount of a suitable silicate binder, is screened through a 100 mesh screen and is hydrated sufficiently to permit handling.

0.95 gram of the material is pressed into a disc having a diameter of 0.917" at a pressure of five tons and is fired at a temperature of 1150° C. The finished microporous ionically-permeable ceramic barrier disc has a diameter of 0.915" and a thickness of 0.035".

Anode foil

The anode foil is a trimetal comprising a 0.002" thick copper strip having a 0.002" thick layer of zinc applied to both of its faces. The width of the trimetal is 0.250". It is corrugated at the rate of 25 corrugations per inch to an overall thickness of 0.015".

The most satisfactory method of producing the trimetal anode foil is by electroplating the copper carrier strip with zinc. It is also possible, however, to braze two zinc strips to the copper strip.

Anode-spacer structure

This structure comprises 34" of corrugated trimetal strip wound with a single strip of Dexter "V" paper, 0.008" thick and 0.320" wide, into a roll held together by a contact ring of commercial bronze. (90% Cu, 10% Zn.)

The anode is wound on a split $\frac{3}{32}$" mandrel with two initial turns of paper and with the entire outer turn of foil exposed for contact with the bronze contact ring. The foil and paper strips are offset with respect to each other by 0.005 to 0.015" to have an edge of the foil protrude at one end of the resulting roll and to have the edge of the spacer material protrude at the other end of the roll.

The bronze contact ring is drawn from 0.015" stock to an outside diameter of 1.022" and is trimmed to a width of 0.210".

The trimetal foil must be thoroughly cleaned and the contact ring bright dipped before assembly.

Anode processing

The wound anode rolls are covered and impregnated with the electrolyte composed of 100 parts by weight of 80% KOH, 16 parts by weight ZnO and 100 parts by weight of water. 1 gram of mercury (approximately 20% of the weight of the zinc present) is dispensed onto the top of each roll and the rolls are heat treated at 55–60° C. for one hour to amalgamate the anode. The rolls are then drained to a minimum extent consistent with dry crimping. This leaves approximately 2.4 cubic centimeters of the electrolyte in the roll.

The anode subassembly is formed by pressing the roll into the bright dipped anode shell of commercial bronze, with the contact ring pressed below foil level and in good contact with the inner surface of the shell. The anode shell has a diameter of 1.065" and a height of 0.280". A slight taper is imparted to the walls of the shell to assure intimate contact thereof with the contact ring.

Assembly

The anode subassembly is inserted into the outer container having an absorbent paper ring therein. The cathode subassembly, including the barrier disc and grommet is placed on top and the mouth portions of the outer container are crimped around the axially extending portion of the grommet. It is advisable to apply sufficient pressure on the assembly to compress the anode roll before crimper contact.

Operation

In the described cell, the depolarizer initially comprises a major portion of mercuric oxide and a minor portion of silver oxide and, as assembled, is in the charged condition. Upon discharging, first substantially all of the silver oxide and then the major portion of the mercuric oxide are reduced to metal, the reduced mercury forming an amalgam with the silver. Subsequent charging of the cell is carried out only to such an extent that the silver is not reoxidized but remains in the metallic state throughout the life of the cell.

The initial charge voltage of the cell is equivalent to the mercury conversion voltage and is approximately 1.5 volts. As the available mercury surface decreases, a step in the voltage curve will be noted and the charge voltage will increase to approximately 1.6 volts, corresponding to the point at which the silver becomes active in distributing the charge. As the total silver-mercury surface becomes further restricted, an additional sharp voltage rise will be noted, corresponding to the production of $Ag_2O$ and gas. Operation in this range is detrimental to the cell and for this reason it is desirable to provide a voltage-responsive charger for the cell which automatically interrupts the charging current as soon as the voltage drop across the charged cell reaches 1.7 volts.

There is appreciable decrease in the availability of active cathode material during the first few cycles of operation with consequent variation in both charge and discharge characteristics but stable operation is generally established within four cycles. In practical life tests, cells of the described type have been subjected to successive cycles of charging and discharging. Each of these cycles comprised charging the cell at 45 milliamperes to the predetermined end voltage and then discharging the cell through a load of 35 ohms for 12 hours. It has been found that the cells will operate satisfactorily under these conditions for a large number of cycles.

Although the present invention has been disclosed in connection with a preferred embodiment thereof, variations and modifications may be resorted to by those skilled in the art without departing from the principles of the present invention. I consider all of these variations and modifications to be within the true spirit and scope of the present invention, as disclosed in the foregoing description and defined in the appended claims.

What is claimed is:

1. An electrical current producing cell comprising, in combination, an electrode shell, a current collector in the form of a foraminous metal member conductively secured to an inner face of said shell, comminuted active electrode material compressed in said shell and embedding said member and constituting one of the electrodes of the cell, a second electrode for the cell, and an electrolyte interposed between and in contact with said electrodes.

2. An electrical current producing cell comprising, in combination, an electrode shell, a wire screen permanently conductively secured to one of the inner faces of said shell, powdered active material compressed in said shell and embedding said screen and constituting one of the electrodes of the cell, a second electrode for the cell, and an electrolyte interposed between and in contact with said electrodes.

3. An electrical current producing cell comprising, in combination, a pair of electrode shells, a wire screen conductively secured to an inner surface of one of said shells, a coherent conductive body of active material compressed in said shell and substantially embedding said screen and constituting one of the electrodes of the cell, a second electrode in the other of said shells, an electrolyte interposed between and in contact with said electrodes, and an insulating and sealing member compressed between cooperating terminal regions of said shells and defining therewith a sealed enclosure for the cell.

4. An electrical current producing cell comprising, in combination, a positive and a negative electrode shell, a wire screen permanently and conductively secured to an inner surface of said positive electrode shell, a positive electrode in the form of a coherent conductive body of comminuted active material compressed in said shell and substantially completely embedding said screen, a negative electrode in said negative electrode shell, an immobilized electrolyte interposed between and in contact with said electrodes, and an insulating and sealing member compressed between cooperating terminal regions of said shells and defining therewith a sealed enclosure for the cell.

5. A rechargeable cell comprising, in combination, a positive and a negative electrode shell, a wire screen spot welded to the bottom surface of said positive electrode shell, a positive electrode in the form of a coherent conductive body of comminuted depolarizer material compressed in said positive electrode shell and substantially completely embedding said wire screen, a negative electrode in said negative electrode shell, an immobilized electrolyte interposed between and in contact with said electrodes, and an insulating and sealing member compressed between cooperating terminal regions of said shells and defining therewith a sealed enclosure for the cell.

6. A rechargeable cell comprising, in combination, positive and negative electrode shells, a wire screen spot welded to an inner surface of said positive electrode shell, a positive electrode including a major portion of an oxide of mercury and a minor portion of a material selected from the group consisting of silver and silver oxide compressed in said positive electrode shell and substantially completely embedding said wire screen, a negative electrode of amalgamated zinc in said negative electrode shell, an immobilized electrolyte of an aqueous solution of an alkali metal hydroxide interposed between and in contact with said electrodes, and an insulating and sealing member compresed between cooperating terminal regions of said shells and defining therewith a sealed enclosure for the cell.

7. A sealed rechargeable alkaline cell comprising, in combination, a positive and a negative electrode shell, a wire screen spot welded to an inner surface of said positive electrode shell, a positive electrode in the form of a coherent conductive body of precipitated mercuric oxide and uniformly dispersed precipitated material selected from the group consisting of silver and silver oxide compressed in said positive electrode shell and substantially completely embedding said screen thereby assuring low resistance electrical contact between said positive electrode and its shell throughout the useful life of the cell, a negative electrode comprising zinc and mercury in said negative electrode shell, an immobilized eleccarrier of inert metal for said negative electrode trolyte of an alkali metal hydroxide, an electrode maintaining the effective distance between the electrodes substantially constant, and an insulating and sealing member compressed between cooperating terminal regions of said shells.

8. A sealed rechargeable alkaline cell comprising, in combination, a positive and a negative electrode shell, a wire screen spot welded to an inner surface of said positive electrode shell, a positive electrode in the form of a coherent conductive body containing a major portion of precipitated mercuric oxide and about 15% to 30% by weight of precipitated and uniformly dispersed material selected from the group consisting of silver and silver oxide compressed in said positive electrode shell and substantially completely embedding said screen thereby assuring low resistance electrical contact between said positive electrode and its shell throughout the useful life of the cell, an ionically permeable barrier on the exposed surface of said positive electrode, a negative electrode carrier of inert metal in said negative electrode shell, a layer of amalgamated zinc on said carrier and constituting the negative electrode of the cell, an immobilized electrolyte comprising an aqueous potassium hydroxide solution initially containing a substantial quantity of potassium zincate interposed between and in contact with said electrodes, and an insulating and sealing member confined between cooperating terminal regions of said shells.

9. An electric current producing cell comprising, in combination, an electrode-spacer structure comprising a roll of electrode foil interleaved with absorbent sheet spacer material with one end portion of said foil exposed at the exterior of the roll, said foil constituting one of the electrodes of the cell, an annular metallic member encircling said roll and in conducting relation with the foil, an electrode shell for said roll having an inner surface frictionally engaging said annular member and in electrical contact therewith, a second electrode for the cell, an electrolyte for said electrodes, and a closure for said shell.

10. An electric current producing cell comprising, in combination, a first electrode shell, a positive electrode compact compressed in the bottom of said shell, a negative electrode-spacer structure comprising a roll of negative electrode foil interleaved with absorbent sheet spacer material with the outer terminal portion of said foil being exposed at the exterior of the roll, the edge of said spacer material projecting at one end of the roll and pressing against the surface of said compact, a metal band encircling said roll and in contact with the foil, an electrolyte absorbed in said spacer material, a second electrode shell encircling said roll in frictional engagement with said band, and insulating sealing means confined between cooperating portions of said shells.

11. An electric current producing cell comprising, in combination, a first electrode shell, a positive electrode compact compressed in the bottom of said shell, a negative electrode-spacer structure comprising a roll of negative electrode foil interleaved with absorbent sheet spacer material with the outer terminal portion of said foil being exposed at the exterior of the roll, the edge of said foil projecting at a first end of said roll and spacer material projecting at the second end of said roll and pressing against the surface of said compact, a metal band encircling said roll and in contact with the foil, an electrolyte absorbent in said spacer material, a second electrode shell encircling said roll in frictional engagement with said band and having an inner surface pressing against the first end of said roll, and insulating sealing means confined between cooperating portions of said shells.

12. An electric current producing cell comprising, in combination, a first electrode shell, a positive electrode compact compressed in the bottom of said shell, a negative electrode-spacer structure comprising a roll of negative electrode foil interleaved with absorbent sheet spacer material with the outer terminal portion of said foil being exposed at the exterior of the roll, the edge of said foil projecting at a first end of said roll and spacer material projecting at the second end of said roll, a band of inert metal encircling said roll and in contact with the foil, an electrolyte absorbed in said spacer material, a second electrode shell encircling said roll in frictional engagement with said band and having an inner surface pressing against the first end of said roll, a barrier layer interposed between the exposed edge of said spacer material and the exposed surface of the positive electrode compact, and an insulative sealing grommet interlocked with said shells to seal the cell, said grommet having an internally extending flange for positively locating said barrier against lateral displacement and for masking the outermost turns of the negative electrode foil in said roll.

13. An electric current producing cell comprising, in combination, a first electrode shell, a positive electrode compact compressed in the bottom of said shell, a negative electrode-spacer structure comprising a roll of negative electrode foil interleaved in staggered relation with absorbent sheet spacer material, the edge of said foil projecting at a first end of said roll and spacer material projecting at the second end of said roll, an electrolyte absorbed in said spacer material, a second electrode shell encircling said roll and having an inner surface pressing against the first end of said roll, an ionically permeable barrier disc interposed between the exposed edge of said spacer material and the exposed surface of said positive electrode compact, and an insulative sealing grommet interlocked with terminal portions of said shells to seal the cell, said grommet having an internally extending flange for positively locating said barrier against lateral displacement and for masking the outermost turns of the negative electrode foil in said roll.

14. A rechargeable cell comprising, in combination, a first electrode shell, a wire screen permanently conductively secured to an inner surface of said shell, a positive electrode compact compressed in said shell and embedding said screen, a negative electrode-spacer structure comprising a roll of negative electrode foil interleaved with absorbent sheet spacer material with the outer terminal portion of said foil being exposed at the exterior of the roll, the edge of said foil projecting at a first end of said roll and spacer material projecting at the second end of said roll, a band of inert metal encircling said roll and in contact with the foil, an electrolyte absorbed in said spacer material, a second electrode shell encircling said roll in frictional engagement with said band and having an inner surface pressing against the first end of said roll, a barrier disc interposed between the exposed edge of said spacer material and the exposed surface of the positive electrode compact, and an insulative sealing grommet confined between terminal portion of said shells to seal the cell, said grommet having an internally extending flange for positively locating said barrier disc against lateral displacement and for masking the outermost turns of the negative electrode foil in said roll.

15. A rechargeable cell comprising, in combination, a first electrode shell, a wire screen permanently conductively secured in the bottom of said shell, a positive electrode compact comprising a major portion of mercuric oxide and a minor portion of a material selected from the group consisting of silver and silver oxide uniformly dispersed therein compressed in said shell and embedding said screen, a negative electrode-spacer structure comprising a roll of zinc-coated inert metal foil interleaved in staggered relation with absorbent sheet spacer material with the outer terminal portion of said foil being exposed at the exterior of the roll, the edge of said foil projecting at a first end of said roll and spacer material projecting at the second end of said roll, a band of electrolyte-inert metal having a low contact potential with respect to zinc encircling said roll and in contact with the foil, an alkali metal hydroxide electrolyte absorbed in said spacer material, a second electrode shell of similar inert metal encircling said roll in frictional engagement with said band and having its end pressing against the foil end of said roll, a self-supporting barrier disc interposed between the exposed edge of said spacer material and the exposed surface of the positive electrode compact, and an insulative sealing grommet confined between terminal portions of said shells, said grommet having an internal flange for locating said barrier disc and for masking the outermost turns of the electrode foil in said roll.

16. A rechargeable cell comprising, in combination, a first shell of nickel-plated steel, a wire screen of nickel-plated steel spot-welded in the bottom of said shell, a positive electrode compact of a major portion of precipitated mercuric oxide having 15% to 30% by weight of precipitated material selected from the group consisting of silver and silver oxide uniformly dispersed therein compressed in said shell and embedding said screen, a negative electrode-spacer structure comprising a roll of amalgamated zinc-coated copper foil interleaved in staggered relation with absorbent sheet spacer material with the outer terminal portion of said foil being exposed at the exterior of the roll, the edge of said foil projecting at a first end of said roll and spacer material projecting at the second end of said roll, a bronze band encircling said roll and in contact with the foil, a potassium hydroxide electrolyte initially containing a substantial amount of potassium zincate absorbed in said spacer material, a second electrode shell of bronze encircling said roll in frictional engagement with said band and having its end pressing against the foil end of said roll, a barrier disc of material inert to the electrolyte interposed between the exposed surface of the positive electrode compact, and an insulative sealing grommet confined between terminal portions of said shells, said grommet having an internal flange for locating said barrier and for masking the outermost turns of the electrode foil in said roll.

17. The cell according to claim 16 wherein a metal jacket is provided around one of the two electrode shells and has its mouth portions constricted around the other electrode shell to hold the electrode shells with the grommet therebetween in axially compressed relation, said electrode shells being capable of limited axial displacement away from each other under the effect of excessive pressure to release such pressure into the interspace between said jacket and said shell.

SAMUEL RUBEN.

No references cited.